United States Patent [19]

Jones, Jr.

[11] 4,099,332

[45] Jul. 11, 1978

[54] ULLAGE GAGE

[75] Inventor: John P. Jones, Jr., Greenwich, Conn.

[73] Assignee: Mobil Oil Corporation, New York, N.Y.

[21] Appl. No.: 786,928

[22] Filed: Apr. 12, 1977

[51] Int. Cl.$^2$ ............................................. G01F 23/00
[52] U.S. Cl. ............................................... 33/126.7 R
[58] Field of Search .................. 73/290, 293; 33/126, 33/126.7

[56] References Cited

U.S. PATENT DOCUMENTS

| | | | |
|---|---|---|---|
| 1,264,143 | 4/1918 | Bennett | 33/126.7 R |
| 2,027,145 | 1/1936 | Beebe | 33/126.7 R |
| 2,596,897 | 5/1952 | Haatvedt | 73/293 |

Primary Examiner—S. Clement Swisher
Attorney, Agent, or Firm—C. A. Huggett; Drude Faulconer

[57] ABSTRACT

An ullage gage for directly and accurately measuring the ullage of a cargo tank of a vessel such as an oil tanker without the necessity of opening the tank. The gage is comprised of a calibrated sword which is affixed to the underside of a cover plate which also contains a viewport for viewing the sword. The cover plate sealingly covers a service opening in the tank. The first calibration mark on the sword coincides with the underside of the deck of the vessel and has a value equal to the actual vertical distance from the lip of the ullage hatch to the underside of the deck at a point adjacent the gage. An adjustable means is provided to adjust the sword with relation to the cover plate to compensate for different deck thicknesses and/or deck camber of the vessel.

12 Claims, 9 Drawing Figures

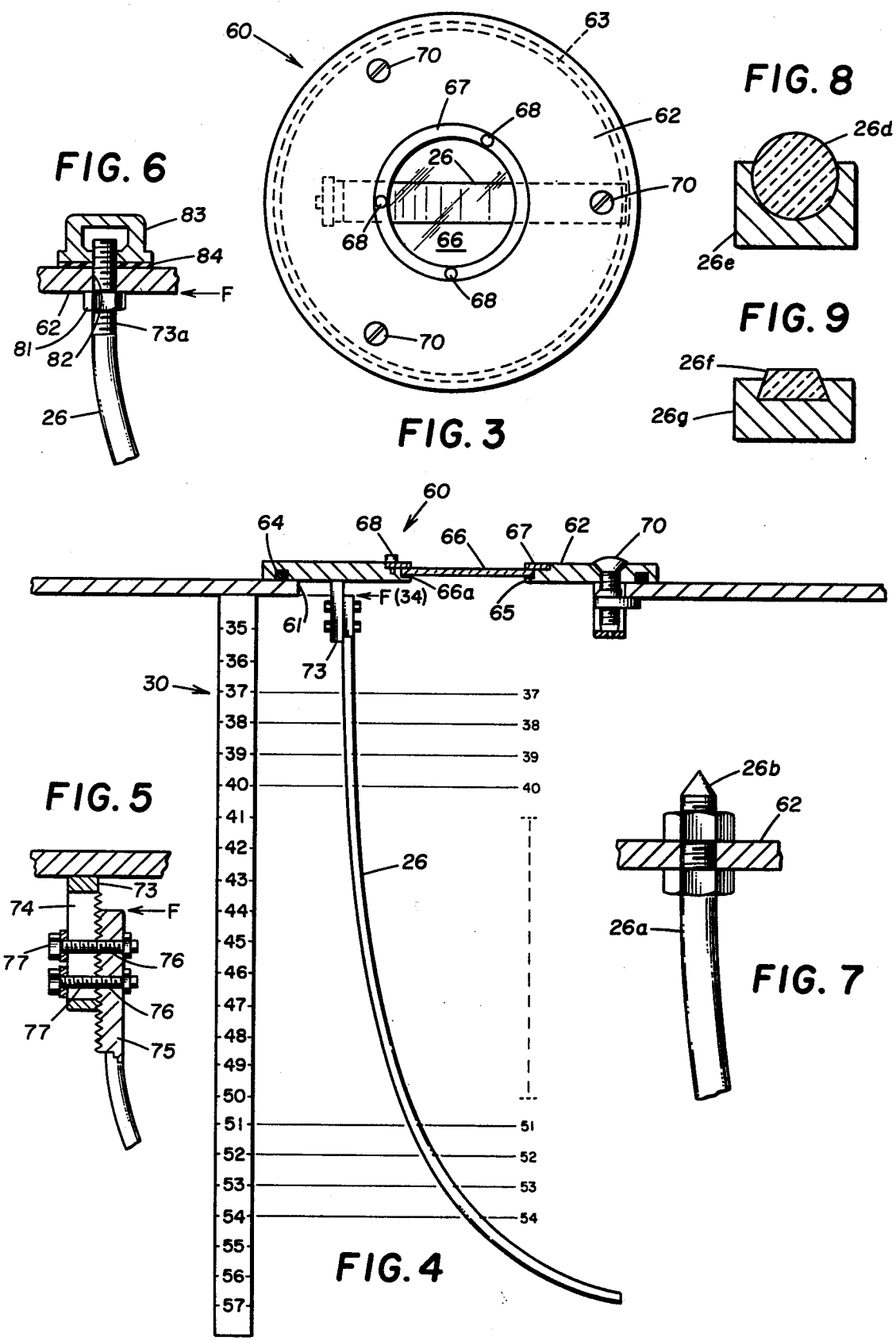

ULLAGE GAGE

BACKGROUND OF THE INVENTION

The present invention relates to an ullage gage and more particularly relates to a gage for directly and accurately measuring the ullage of a cargo tank of a vessel such as an oil tanker.

In loading liquid cargo vessels such as oil tankers, the volume of liquid in a cargo tank is routinely determined by measuring the "ullage" of the tank after it is loaded. Ullage is generally defined as the amount by which a cargo tank falls short of being full and is directly related to the distance between the top of the cargo and the underside of the top of the tank. In most commercial tankers, the ullage measurement is made from a special hatch, i.e., ullage hatch, which sets atop the main hatch into the cargo tank. Once the ullage measurement is made, a standard set of ullage tables for that particular tanks is consulted to establish the actual volume of cargo present in the tank.

As the over-all size of a cargo tank increases, the accuracy of the ullage measurement becomes more and more important. For example, due to the extremely large tanks on some modern tankers, an error of one-half inch in the ullage measurement can mean an error of 5000 gallons or more in the actual volume of cargo in that tank. The economics involved in such an error is obvious.

In a typical cargo loading operation, liquid is normally loaded into a cargo tank at a high flow rate until the tank is filled to within 5 to 6 feet of the top of the tank which is, also, normally the underside of the main deck of the vessel. The flow rate is then substantially reduced to guard against accidental overfilling which may rupture the deck. The tank is then "topped off" by slowly filling the tank to within a few inches, e.g., 6 to 24 inches, of the deck. At this time, the final ullage measurement is taken by lowering a plumb bob measuring line through the ullage hatch. The volume of cargo in the tank is then determined from the ullage tables using this highly reliable, handmade measurement.

However, developments in recent years have complicated the use of the conventional hand ullage gage in topping out cargo tanks. For example, inert gas systems, which are designed to provide nonflammable gases under pressure in a cargo tank, have to be released before the plumb bob can be lowered through the ullage hatch into the tank. Releasing the inert gas reduces the margin of safety of the system in that there is a greater risk that air might be drawn into the cargo tank, thereby creating an explosive environment within the tank.

Further, there is now an awareness that ullage bobs lowered into cargo tanks act to concentrate the electrostatic field commonly present during tanker operations. Under certain conditions, this can cause an electrostatic discharge of sufficient intensity to ignite any explosive mixture that may be present in the tank. Therefore, the need exists for a relatively simple ullage gage which has the accuracy and reliability of a conventional ullage bob but one which does not require the opening of the tank for its use.

SUMMARY OF THE INVENTION

The present invention provides an ullage gage for directly and accurately determining the ullage of a cargo tank without the need for opening the tank.

Structurally, the ullage gage comprises an indicator sword which is attached to the underside of the deck and extends downward into the tank for a distance equal to the maximum expected ullage in the cargo tank. A viewport is positioned through the deck adjacent the indicator sword so the sword can be observed directly from the deck without opening the tank.

Preferably, the sword is curved so that the lower portion of its length will underlie the viewport thereby aiding an observer in reading the ullage gage. Calibration marks, e.g., inch divisions, are provided on the sword for actually determining the ullage measurement. Where the sword is curved, these marks will not be linearly spaced throughout the curved portion of the sword but will be positioned to indicate true vertical distance between the underside of the deck and a respective mark.

Presently available, standard ullage tables give the actual volume of cargo in a particular tank as a function of the direct ullage measurement taken from the lip of the ullage hatch, e.g., 30 to 40 inches above the deck. The present ullage gage takes this into consideration by making the value of the calibration marks on the sword reflect this additional height between the ullage hatch and the underside of the deck adjacent the gage so that the exact ullage reading can be taken directly from the gage. Further, since the thickness and the camber of the decks on various vessels may vary, the present gage includes an adjustable means to compensate for different deck thicknesses and/or deck cambers so that one gage can be used on a variety of different vessels.

In installing the ullage gage, it may be affixed directly to the underside of the deck but preferably it is affixed to the underside of a cover plate, commonly called a "Butterworth cover" which is used to seal small service openings normally present in most cargo tanks. By installing the gage in this manner, the viewport is also in the cover plate which eliminates the need to cut additional openings through the deck. Also, by using quick-release means on the cover plate, the sword may be easily serviced and the viewport cleaned before each filling operation, if necessary or desired.

BRIEF DESCRIPTION OF THE DRAWINGS

The actual construction, operation, and the apparent advantages of the present invention will be better understood by referring to the drawings in which like numerals identify like parts and in which:

FIG. 3 is a top view of a cover plate for use with the present invention;

FIG. 4 is an enlarged sectional view of the ullage gage of the present invention;

FIG. 5 is a partial view of one means for affixing the ullage gage in position;

FIG. 6 is a partial view of another means for affixing the ullage gage in position;

FIG. 7 is a partial view of a modification of the ullage gage;

FIG. 8 is a cross-sectional view of another modification of the ullage gage; and FIG. 9 is a cross-sectional view of still another modification of the ullage gage.

DESCRIPTION OF THE PREFERRED EMBODIMENT

Figure 1:
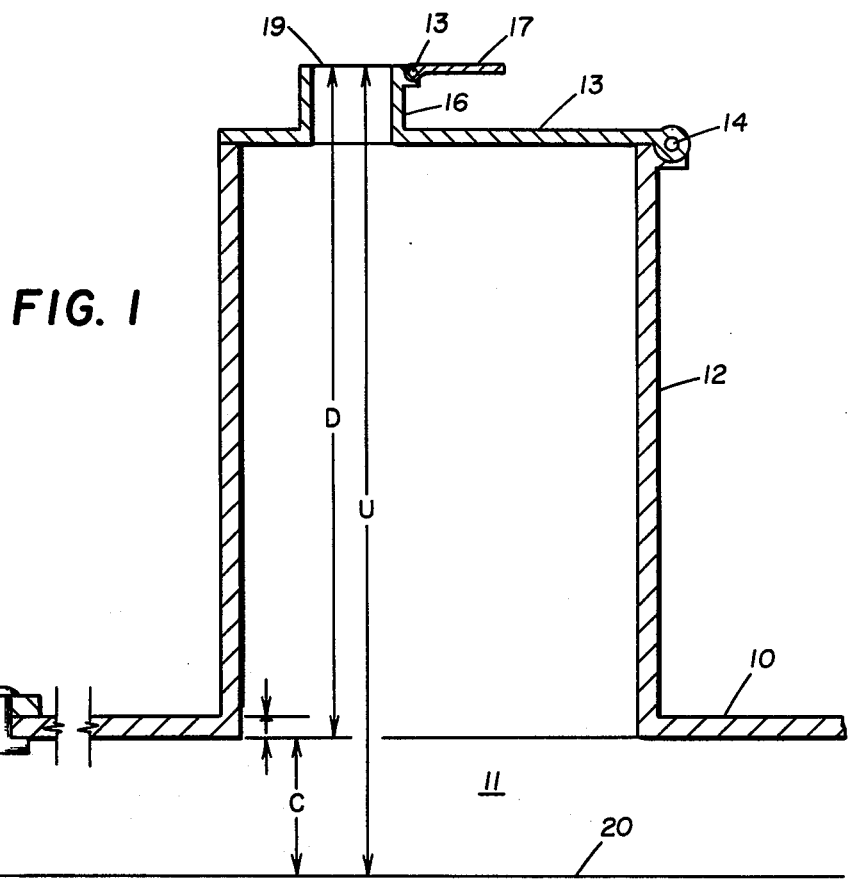
FIG. 1 is a partial vertical sectional view of the present ullage gage installed in a cargo tank of a vessel.
Figure 2:
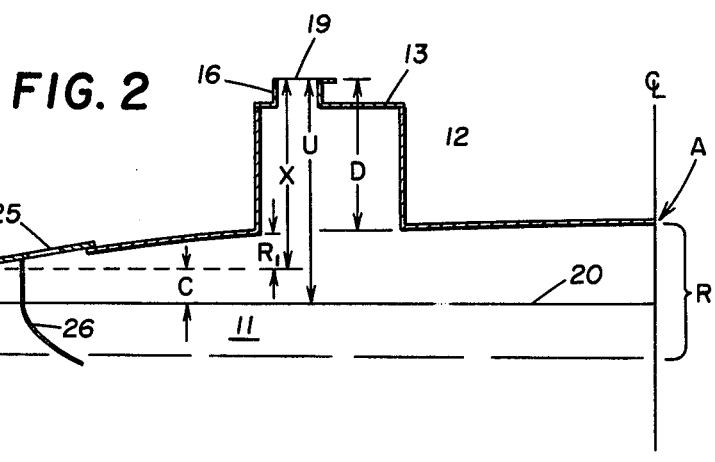
FIG. 2 is a partial cross-sectional view, reduced from FIG. 1, illustrating the deck camber of a vessel having the ullage gage of present invention installed thereon.

Referring more particularly to the drawings, FIGS. 1 and 2 disclose a partial section of deck 10 of a cargo vessel, e.g., an oil tanker. In vessels of this type, deck 10 normally overlies and forms the top of a cargo tank 11. Main entry into tank 11 is provided through main hatch 12 which is normally closed by cover 13 which may be hinged to hatch 12 by means of pin 14 (FIG. 1) for easy opening and closing. As is standard practice, mounted on cover 13 is a smaller hatch 16 (commonly called the ullage hatch) which is normally closed by cover 17 (shown in open position) which may be hinged to ullage hatch 16 by means of pin 18 for easy opening and closing.

As will be understood in the art, the ullage of tank 11 is normally measured through ullage hatch 16 by lowering a plumb bob measuring line (not shown) therethrough. The ullage of a tank is that distance U from lip 19 of ullage hatch 16 to the top of cargo 20 in tank 11 and will be the sum of the distance D between the lip 19 and the underside of deck 10 and the distance C between the underside of deck 10 and the top of cargo 20. Ullage tables are available for a particular tank 11 which give the volume in a particular tank as a function of the ullage value U.

In accordance with the present invention, ullage gage 25 is provided which can directly measure the ullage of tank 11 without necessitating the opening of tank 11 to the atmosphere. Ullage gage 25 is comprised basically of calibrated sword 26 and an adjacent viewpoint 27 through deck 10. Sword 26 is affixed to the underside of deck 10 and extends downward into tank 11. The length of sword 26 should be such, e.g., 30 inches, that it will measure the maximum ullage normally expected in tank 11.

Although sword 26 can be straight if tank 11 is normally to be filled almost to the top, preferably sword 26 is curved as shown in the figures so that the lower portion of sword 26 will underlie viewport 27, thereby aiding an observer in reading sword 26. When sword 26 is curved, the calibration marks thereon will not be linear but will correspond to the actual vertical distances from the underside of deck 10. To calibrate curved sword 26, a linear scale 30 (FIG. 4) is positioned adjacent sword 26 and the calibration marks are transposed as shown. The actual values assigned to the calibration marks as indicated in FIG. 4 will be explained in more detail below.

As mentioned above, sword 26 can be affixed by welding or the like directly to the underside of deck 10 adjacent viewport 27. However, it is preferred to incorporate both sword 26 and viewport 27 into a special quick-release cover plate 60 which is of the general type commonly referred to as a "Butterworth cover". Such covers are routinely used on commercial tankers to close the small service openings 61 which are normally provided in deck 10 for servicing tank 11 and/or cargo 20. By incorporating ullage gage 25 with cover plate 60, the gage can be easily removed for servicing and/or replacement as the need arises. Also, viewport 27 can be cleaned before tank 11 is filled.

As best seen in FIGS. 3 and 4, cover plate 60 is comprised of a plate element 62 which has a circumferential groove 63 on the underside thereof which carries a sealing means, e.g., O-ring 64, for preventing leakage when plate 60 is in place over opening 61. An opening 65 is provided through plate element 62 which is covered by viewplate 66 which, in turn, is held in place by ring 67 and screws 68. A gasket 66a is positioned between plate element 62 and viewplate 66 to prevent leakage around viewplate 66. Viewplate 66 is comprised of a transparent material and is preferably of strong, unbreakable material, e.g., safety glass, thermoplastic polycarbonate resin commercially available under the trade name LEXAN, or similar material. Also, viewplate 66 may have magnifying characteristics if necessary to aid an observer in taking a reading from view gage 25.

Cover plate 60 has a plurality of quick-releasable lock means 70 spaced about the periphery thereof for securing plate 60 in place over opening 61 in deck 10. Lock means 70 may be of any type which allows quick removal and installation of cover plate 60 while maintaining a tight seal between cover plate 60 and deck 10 around opening 61. An example of such cover plate lock means is fully disclosed and described in inventor's copending U.S. application Ser. No. 776,086, filed Mar. 9, 1977 now U.S. Pat. No. 4,059,202.

If ullage gage 25 is to be used on vessels having the same deck thickness and/or deck camber, sword 26 may be welded or otherwise secured directly to the underside of cover plate 60 but, preferably, an adjustable means is provided for securing sword 26 to cover plate 60. The adjustment of sword 26 with relation to the underside of cover plate 60 is made to compensate for the deck thickness T (FIG. 1) and/or deck camber $R_1$ (FIG. 2).

As illustrated in FIG. 1, if sword 26 is to measure ullage U directly, the first calibration mark F must be of a value equal to the vertical distance D. In other words, if the vertical distance D from lip 19 to the underside of deck 10 is, for example, 34 inches, the mark F on sword 26 should read 34 inches (see FIG. 4) and this mark F must coincide with the underside of deck 10. Now, if the distance C (that distance which cargo 20 falls below deck 10) is actually 5 inches, the value of sword 26 will read 39 inches which is a direct reading of ullage U and can be used in determining the volume of cargo 20 directly from standard ullage tables for tank 11. It can be seen that if deck thickness T varied from that shown in FIG. 4, mark F would not coincide with the underside of deck 10 if sword 26 was not adjustable and an ullage reading off sword 26 would be inaccurate. Therefore, where a standard ullage gage is to be used on vessels having different deck thicknesses and/or deck cambers, some means for adjusting the gage is required.

Deck camber, as understood in the art, is the vertical distance R (shown exaggerated in FIG. 2) between "deck at center" A and "deck at side" B and may range up to 3 to 4 feet on some of today's larger tankers. The deck camber is known for a particular tank and is considered in computing the standard ullage tables for that particular tank. Accordingly, the deck camber must be considered in calibrating sword 26 so that initial calibration mark F will be positioned to reflect the deck camber $R_1$ at the point where gage 25 is positioned through deck 10. The value assigned to mark F of the sword 26 in FIG. 2 will be equal to the vertical distance X which is the sum of (1) vertical distance D, (2) vertical distance $R_1$, and (3) deck thickness T (not shown in FIG. 2). In other words, the distance X is the total vertical distance between lip 19 and the underside of deck 10 at a point adjacent gage 25 and by setting the value of F equal to X, a direct ullage reading can be made from gage 25. In practice, gage 25 will be installed over an available service opening near hatch 12, so only a relatively small adjustment range of sword 26 will normally be needed to compensate for most deck thicknesses and/or deck cambers. This allows a single, standard calibrated sword 26 to be used on a variety of commercial tankers.

As seen in FIGS. 4 and 5, one means 72 for adjustably connecting sword 26 to cover plate 60 is comprised of lug 73 which is affixed to the underside of plate element 62 and has an elongated slot 74 therein. The upper end 75 of sword 26 has openings 76 therethrough to receive bolts 77 which also pass through slot 74 in lug 73. It can be seen that the relative position between lug 73 and upper end 75 can be adjusted to align mark F with the underside of deck 10, and nuts 78 tightened on bolts 77 to secure sword 26 in this desired position. This adjustment allows a standard ullage gage of the present invention to be used on most of the known tankers where the deck thicknesses of the different tankers may vary from ½ to 1½ inches. In the modification shown in FIGS. 4 and 5, the mating sides of lug 73 and upper end 75, also, may be serrated to aid in holding the two in a selected position. It should be recognized that in some instances, slot 74 may be omitted and holes drilled through lug 73 at the exact, desired location where sword 26 is to be bolted to lug 26.

A modification of a means for adjustably connecting sword 26 to cover plate 60 is shown in FIG. 6. The upper end 73a of sword 26 is threaded and adjusting nut 81 is threaded thereon to a position where calibration mark F will coincide with the adjacent underside of deck 10 when upper end 73a is positioned in smooth opening 82 in plate element 62. An internally threaded cap 83 is threaded onto the upper end 73a to secure sword 26 in place. A sealing means, e.g., gasket 84, is provided to prevent leakage around sword 26.

Sword 26 may be constructed from a variety of materials, e.g., steel, stainless steel, bronze, etc. Sword 26 may be lightly colored or phosphorescent with contrasting colored calibration marks thereon for easy visibility through viewport 27, especially with the aid of a flashlight or the like. Also, the surface of sword 26 may be coated with an oil resistive material, e.g., Teflon, so that the portion of sword 26 above cargo 20 will remain free of cargo which further aids in reading the proper calibration mark.

FIG. 7 shows still another modification of the sword wherein sword 26a is comprised of a clear, light-conducting resin material such as Lucite, having the calibration marks etched thereon. The top of sword 26a is pointed with one portion 26b being coated with some reflective surface so that when a flashlight or the like is shone onto surface 26c, the beam of light will deflect down through sword 26a, thereby illuminating the calibration marks for easy reading. Sword 26a may be constructed entirely of Lucite (FIG. 7) or be comprised of a cylindrical rod of Lucite 26d mounted in a stainless steel housing 26e (FIG. 8) or a flattened strip of Lucite 26f mounted in a stainless steel housing 26g (FIG. 9).

Ullage gage 25 may also include additional features (not shown). For example, a protective cover may be provided for viewplate 66 to protect it from scratching or breaking during nonuse period. Also, a "windshield" wiper may be positioned to wipe the underside of viewplate 66 with a sealed shaft extending upward through plate element 62 to actuate the wiper to clean viewplate 66 when necessary.

From the above description, it can be seen that the present ullage gage provides a simple and reliable means for directly, accurately, and safely making the ullage measurement for a cargo tank which can be used with present ullage tables to determine the amount of cargo in a tank. By providing that this ullage measurement can be made without opening the cargo tank, serious safety hazards have been eliminated without any loss of accuracy or reliability.

What is claimed is:

1. A gage for measuring the ullage of a cargo tank located below the deck of a vessel, said gage comprising:
    a sword affixed to the underside of said deck and extending downward into said cargo tank, said sword having a plurality of spaced calibration marks thereon, each of said marks indicative of a discrete vertical distance below the underside of the deck; and
    a viewport through said deck adjacent said sword for viewing said plurality of said spaced calibration marks on said sword from said deck, said sword being curved so that the lower portion of said sword will underlie said viewport.

2. The gage of claim 1 wherein said viewport comprises:
    an opening through said deck adjacent said sword; and
    a plate of transparent, unbreakable material sealingly closing said opening.

3. A gage for measuring the ullage of a cargo tank located below the deck of a vessel, said gage comprising:
    a cover plate normally used for sealing a service opening through said deck into said tank;
    an elongated sword affixed to the underside of said cover plate and adapted to extend downward into said tank when said cover plate is in position over said service opening, said sword having calibration marks thereon indicative of discrete, vertical distances below the underside of said deck;
    a viewport opening through said cover plate, said sword being curved so that the lower portion of said sword will underlie said viewport opening; and
    a plate of transparent material sealingly secured over said viewport opening.

4. The gage of claim 3 wherein said sword is coated with an oil resistive material.

5. The gage of claim 3 wherein said sword is comprised of clear, light-conducting resin material with said calibration marks etched thereon.

6. The gage of claim 3 wherein said plate of said transparent material has magnifying characteristics.

7. The gage of claim 3 including:
    adjustable means for affixing said sword to said underside of said cover plate whereby a first calibration mark on said sword may be adjusted with relation to the underside of said cover plate to compensate for the thickness of said deck and/or deck camber.

8. The gage of claim 7 wherein said adjustable means comprises:
    a lug affixed to the underside of said cover plate, said lug having a slot therein;
    openings in the upper portion of said sword; and threaded means passing through said slot and said openings in said sword for securing said sword to said lug.

9. The gage of claim 8 wherein the mating surfaces between said lug and upper portion of said sword are serrated.

10. The gage of claim 7 wherein said adjustable means comprises:

a threaded portion on the upper end of said sword;

an adjusting nut threaded onto said threaded portion of said sword to a desired position;

an opening through said cover plate through which said threaded portion of said sword above said adjusting nut passes; and a cap threaded onto said threaded portion of said sword which extends through said opening in said cover plate.

11. The gage of claim 3 wherein said sword has a first calibration mark coinciding with the underside of said deck, said first calibration mark having a designated value indicative of the actual vertical distance from the lip of a ullage hatch on said tank and each subsequent calibration mark increasing in designated value from said first calibration mark so that a direct ullage reading may be taken from said sword.

12. The gage of claim 7 wherein said first calibration mark on said sword has a value indicative of the actual vertical distance from the lip of the ullage hatch of said tank to the underside of said deck adjacent said gage and the value of each subsequent calibration mark increases therefrom so that a direct ullage reading may be taken from said sword.

* * * * *